(12) United States Patent
Spaunhorst et al.

(10) Patent No.: US 12,517,529 B1
(45) Date of Patent: Jan. 6, 2026

(54) SYSTEMS AND METHODS OF FLUID FLOW CONTROL WITH TWO VALVES

(71) Applicant: Rolls-Royce North American Technologies Inc., Indianapolis, IN (US)

(72) Inventors: Otto Spaunhorst, Indianapolis, IN (US); Dan Edwards, Indianapolis, IN (US); Karla Yale, Indianapolis, IN (US); Mun Hong Lim, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/825,749

(22) Filed: Sep. 5, 2024

(51) Int. Cl.
  *F02C 7/057* (2006.01)
  *F02C 9/16* (2006.01)
  *G05D 7/06* (2006.01)

(52) U.S. Cl.
  CPC ........... *G05D 7/0652* (2013.01); *F02C 7/057* (2013.01); *F02C 9/16* (2013.01)

(58) Field of Classification Search
  CPC .......... G05D 7/0652; F02C 7/057; F02C 9/16
  See application file for complete search history.

(56) References Cited

U.S. PATENT DOCUMENTS

| | | | | |
|---|---|---|---|---|
| 3,006,145 A | * | 10/1961 | Sobey ................... | F04D 27/023 60/39.27 |
| 3,556,126 A | * | 1/1971 | Oswald ................ | G05D 7/0635 137/118.04 |
| 4,030,523 A | * | 6/1977 | Cram .................... | G05D 7/0652 137/599.07 |
| 5,304,093 A | * | 4/1994 | Sharp .................... | B08B 15/023 454/61 |
| 5,329,965 A | * | 7/1994 | Gordon ................ | G05D 7/0652 137/599.07 |

(Continued)

FOREIGN PATENT DOCUMENTS

EP     3045675 A1 *  7/2016  ............. F01D 17/06

OTHER PUBLICATIONS

"Center Seeking Control," dated Jun. 26, 2024, pp. 1-3, PIDlab, available at www.pidlab.com/oldweb/en/center-seeking-control.html.
"Center Seeking Controls," dated Aug. 1, 2013, pp. 1-10, Rex Controls, video available at www.youtube.com/watch?v=CKbC2x9gE5g.
"Split Range Control," dated Apr. 17, 2009, pp. 1-2, Siemens AG, available at support.industry.siemens.com/forum/ca/en/posts/split-range-control/28984/?page=1&pageSize=10.

(Continued)

*Primary Examiner* — Nathaniel E Wiehe
*Assistant Examiner* — Wayne A Lambert
(74) *Attorney, Agent, or Firm* — Hussey IP, LLC

(57) ABSTRACT

Systems and methods for fluid flow control are provided. A coarse valve and a fine valve are connected in parallel in a conduit. A coarse valve controller controls the coarse valve in a feedback loop in which an error signal is feedback to the coarse valve controller and a coarse valve setting is an output of the coarse valve controller. The error signal is a difference between the property of the fluid flow and a set point. The coarse valve controller operates as a proportional-integral controller. A fine valve controller controls the fine valve in the same feedback loop as the coarse valve controller. The fine valve controller has a center-seeking control scheme and operates as a proportional controller or a proportional-integral controller depending on whether the coarse valve setting is in a saturation range.

15 Claims, 8 Drawing Sheets

(56) References Cited

U.S. PATENT DOCUMENTS

| | | | | |
|---|---|---|---|---|
| 5,435,779 | A | * | 7/1995 | Sharp .................. F24F 11/74 454/238 |
| 7,543,595 | B2 | * | 6/2009 | Jacob .................. G05D 7/0635 73/1.16 |
| 9,926,801 | B2 | | 3/2018 | Uskert et al. |
| 9,945,247 | B2 | | 4/2018 | Appukuttan et al. |
| 2007/0119150 | A1 | * | 5/2007 | Wood .................. F02C 7/042 60/226.1 |
| 2009/0312852 | A1 | * | 12/2009 | Yuan .................. G05B 13/021 700/282 |
| 2014/0034164 | A1 | * | 2/2014 | Yasuda .............. G05D 7/0617 137/599.01 |
| 2018/0171877 | A1 | * | 6/2018 | Moniz .................. F02C 3/04 |
| 2018/0231991 | A1 | * | 8/2018 | Baxter .................. F16K 31/02 |
| 2019/0024527 | A1 | | 1/2019 | Skertic et al. |
| 2023/0008514 | A1 | * | 1/2023 | Durocher .............. F02C 6/08 |

OTHER PUBLICATIONS

"Split Range Control," dated Jun. 11, 2024, pp. 1-3, PIDlab, available at www.pidlab.com/oldweb/en/advanced-control-schemes.html.

Fatani, Sultan T. et al., "A Novel Single-Input Two-Output (SITO) Strategy for Split Range Control," dated May 2017, pp. 1-7, ResearchGate, Dhahran 31311, Saudi Arabia.

Reyes-Lua, Adriana et al., "Systematic Design of Split Range Controllers," dated 2019, pp. 898-903, Elsevier, IFAC PapersOnLine 52-1.

Svensson, Eskil, "Evaluation of Smart Split-Range Control Strategies for Optimized Turbine and Steam Control in Pulp and Paper Plants," dated Jul. 26, 2019, pp. 1-55, Lulea University of Technology, Sweden.

* cited by examiner

SYSTEMS AND METHODS OF FLUID FLOW CONTROL WITH TWO VALVES

This invention was made with government support under contract number HQ00342090012 awarded by the Strategic Capabilities Office (SCO) of the Department of Defense. The government has certain rights in the invention.

TECHNICAL FIELD

This disclosure relates to fluid flow control and, in particular, to control of fluid flow using two valves.

BACKGROUND

Present fluid flow control systems suffer from a variety of drawbacks, limitations, and disadvantages. Accordingly, there is a need for inventive systems, methods, components, and apparatuses described herein.

BRIEF DESCRIPTION OF THE DRAWINGS

The examples may be better understood with reference to the following drawings and description. The components in the figures are not necessarily to scale. Moreover, in the figures, like-referenced numerals designate corresponding parts throughout the different views.

DETAILED DESCRIPTION

Figure 1:
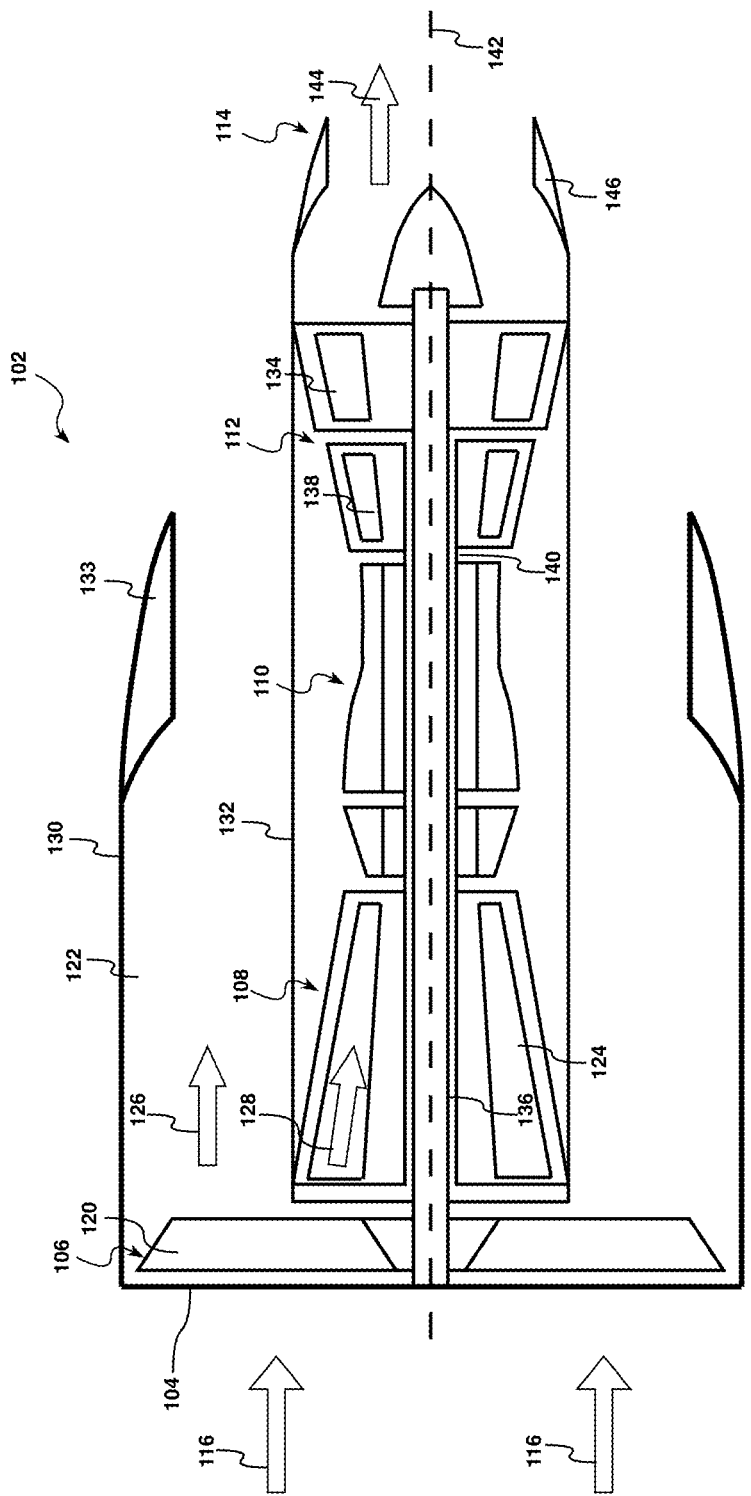
FIG. 1 illustrates a cross-sectional view of a gas turbine engine.

In a first example, a system for fluid flow control is provided. The system includes a coarse valve, a fine valve, a flow sensor, a coarse valve controller, and a fine valve controller. The coarse valve and fine valve are connected in parallel in a conduit, and the coarse valve has a larger maximum flow capacity than the fine valve. The flow sensor is configured to detect a property, such as the speed, of a fluid flow that passes through the coarse valve and the fine valve in the conduit. The coarse valve controller is configured to control the coarse valve as a proportional-integral controller having an error signal as an input, where the error signal is a difference between the property of the fluid flow and a set point. The coarse valve controller is configured to maintain a position of the coarse valve if the error signal is in a dead zone range or if a coarse valve setting is in a saturation range. The fine valve controller is configured to control the fine valve as a proportional controller having the error signal as an input unless the coarse valve setting is in the saturation range. The fine valve controller is further configured to control the fine valve as a proportional-integral controller having the error signal as the input if the coarse valve setting is in the saturation range. The fine valve controller has a center-seeking control scheme regardless of whether the fine valve controller is configured as the proportional controller or the proportional-integral controller.

One interesting feature of the systems and methods described below may be reaching the set point faster and/or with less overshoot than with other systems or methods. This may feature may be helpful in applications requiring precise and fast acting control over a relatively large flow range.

For purposes of promoting an understanding of the principles of the disclosure, reference will now be made to the examples illustrated in the drawings, and specific language will be used to describe the same. It will nonetheless be understood that no limitation of the scope of the disclosure is intended by the illustration and description of certain examples of the disclosure. In addition, any alterations and/or modifications of the illustrated and/or described examples(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Systems of fluid flow control with two valves are described further below. The systems of fluid flow control may be used in a gas turbine engine in some examples. In still other examples, the systems of fluid control may be used in any other type of application involving fluid flow control, such as in chemical processing applications, reciprocating engines, internal combustion engines, or any other type of application.

First, to better understand the operation of a gas turbine engine 102, FIG. 1 illustrates a cross-sectional view of the gas turbine engine 102. In the illustrated example, the gas turbine engine 102 is a turbofan engine. While the gas turbine engine 102 is illustrated in a simplistic schematic form, it should be understood that the present disclosure is not limited to any particular engine design or configuration and, as such, may be used with any form of gas turbine engine, such as turboprop engines, turbojets, turboshaft engines, unducted fan engines, and others having a range of complexities including multiple spools (multiple turbines operationally connected to multiple compressors), variable geometry turbomachinery, and in commercial or military applications. The gas turbine engine 102 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 102 may be utilized in a configuration unrelated to an aircraft such as an industrial application, an energy generation application, a power plant, a pumping set, a marine application (for example for naval propulsion), a weapon system, a security system, or a perimeter defense. The systems may include any form of gas turbine engine, such as those for aircraft propulsion, generating electric power, fluid pumping applications, land vehicle propulsion, and watercraft propulsion.

The gas turbine engine 102 is described herein generally as one example, however significant details regarding gas turbine engine design and operation will not be presented herein as it is believed that the theory of operation and general parameters of gas turbine engines are well known to those of ordinary skill in the art. The gas turbine engine 102 includes an inlet section 104, a fan section 106, a compressor section 108, a combustor section 110, a turbine section 112, and an exhaust section 114. In operation, air illustrated by arrows 116 is drawn in through the inlet section 104 and passes through at least one fan stage 120 of the fan section 106 where the ambient air is compressed to a higher pressure. After passing through the fan section 106, the air may be split into a plurality of flowstreams. In this example, the airflow is spilt into a bypass duct 122 and a core passageway 124. Airflow through the bypass duct 122 and the core passageway 124 is illustrated by arrows 126 and 128 respectively. The bypass duct 122 encompasses the core passageway 124 and may be defined by an outer circumferential wall 130 and an inner circumferential wall 132. The bypass duct 122 may also include a bypass nozzle 133 operable for creating a pressure differential across the fan 120 and for accelerating the bypass airflow 126 to provide bypass thrust for the gas turbine engine 102.

The core airflow 128 enters the core passageway 124 after passing through the fan section 106. The core airflow 128 is then further compressed in the compressor section 108 to a higher pressure relative to both ambient pressure and the air pressure in the bypass duct 122. The air is mixed with fuel in the combustor section 110 wherein the fuel/air mixture burns and produces a high temperature working fluid from which the turbine section 112 extracts power. The turbine section 112 may include a low-pressure turbine 134 mechanically coupled to the fan section 106 through a low pressure shaft 136 and a high pressure turbine 138 mechanically coupled to the compressor section 108 through a high pressure shaft 140. The shafts 136, 140 rotate about a centerline axis 142 that extends axially along the longitudinal axis of the gas turbine engine 102, such that as the turbine section 112 rotates due to the forces generated by the high-pressure working fluid, the fan section 106 and compressor section 108 section are rotationally driven by the turbine section 112 to produce compressed air. After passing through the turbine section 112, the core flow represented by arrow 144 is accelerated to a high velocity through a core exhaust nozzle 146 to produce thrust for the gas turbine engine 102.

Figure 2:
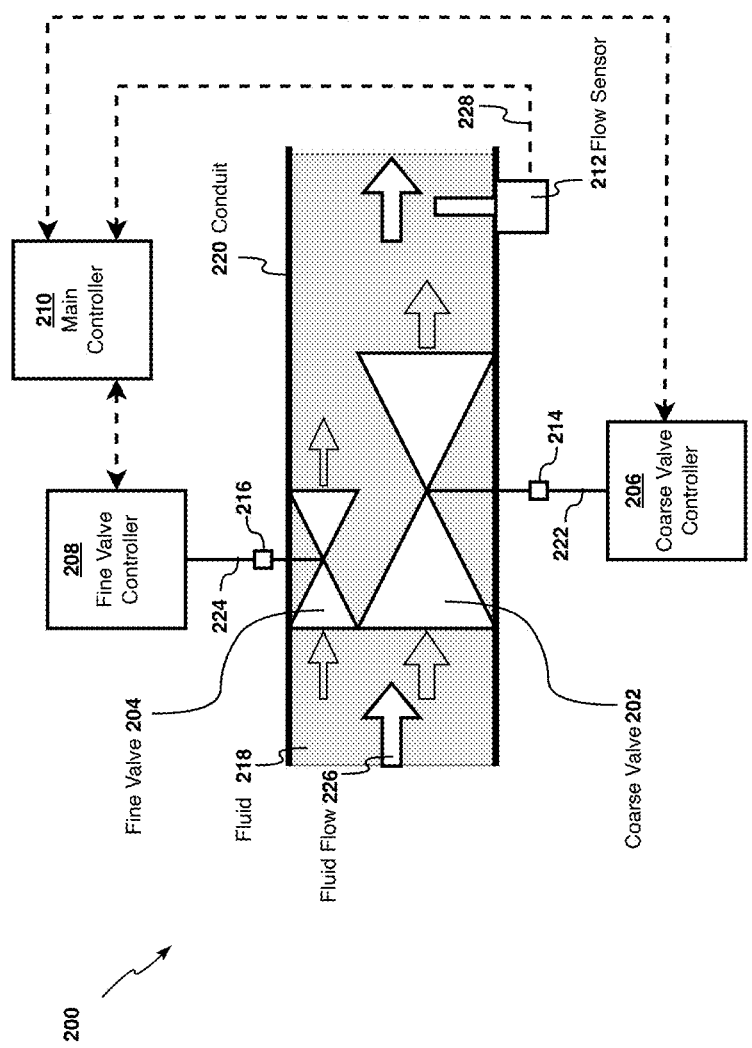
FIG. 2 is a schematic drawing of an example of a system of fluid flow control with two valves.

FIG. 2 is a schematic drawing of an example of a system 200 of fluid flow control with two valves 202 and 204. As explained further below, the system 200 of fluid flow control may be used in and/or with the gas turbine engine 102. The system 200 of fluid control in FIG. 2 includes a coarse valve 202, a fine valve 204, a coarse valve controller 206, a fine valve controller 208, a main controller 210, a flow sensor 212, a coarse valve actuator 214, and a fine valve actuator 216.

The coarse valve 202 and the fine valve 204 are arranged in parallel such that a fluid 218, such as air, which flows through a conduit 220, may pass through the coarse valve 202 or the fine valve 204, or both, depending on whether the valves 202 and 204 are open.

The coarse valve 202 may be any valve that has a higher maximum flow capacity than the fine valve 204. Consequently, the terms "coarse" and "fine" as used herein to describe the two valves 202 and 204 refer to the maximum flow capacity of the two valves 202 and 204 relative to each other. Accordingly, the terms "coarse" and "fine" as used herein do not refer to any specific maximum flow capacity or to the extent to which either of the valves 202 and 204 may be open. Other components referred to as "coarse" or "fine" herein, are done so only to indicate which of the two valves 202 and 204 the respective component is paired with. For example, the coarse valve controller 206 and the coarse valve actuator 214 are paired with the coarse valve 202, whereas the fine valve controller 208 and the fine valve actuator 216 are paired with the fine valve 204. A maximum flow capacity is a rating for a valve that indicates the maximum amount of fluid per unit of time that may pass through the valve when the valve is fully open.

During operation of the system 200, the coarse valve 202 may be actuated by the coarse valve actuator 214. The position of the coarse valve actuator 214, and hence the extent that the coarse valve 202 is open, is determined by a coarse valve setting 222 generated by the coarse valve controller 206. Similarly, the fine valve 204 may be actuated by the fine valve actuator 216. The position of the fine valve actuator 216, and hence the extent that the fine valve 204 is open, is determined by a fine valve setting 224 generated by the fine valve controller 208.

The main controller 210 in FIG. 2 is in communication with the coarse valve controller 206, the fine valve controller 208, and the flow sensor 212. As described in detail below, the main controller 210, together with the coarse valve controller 206 and the fine valve controller, controls the speed of a fluid flow 226 of the fluid 218 through the conduit 220. The speed of the fluid flow 226 through the conduit 220 may be detected by the flow sensor 212.

Figure 3:
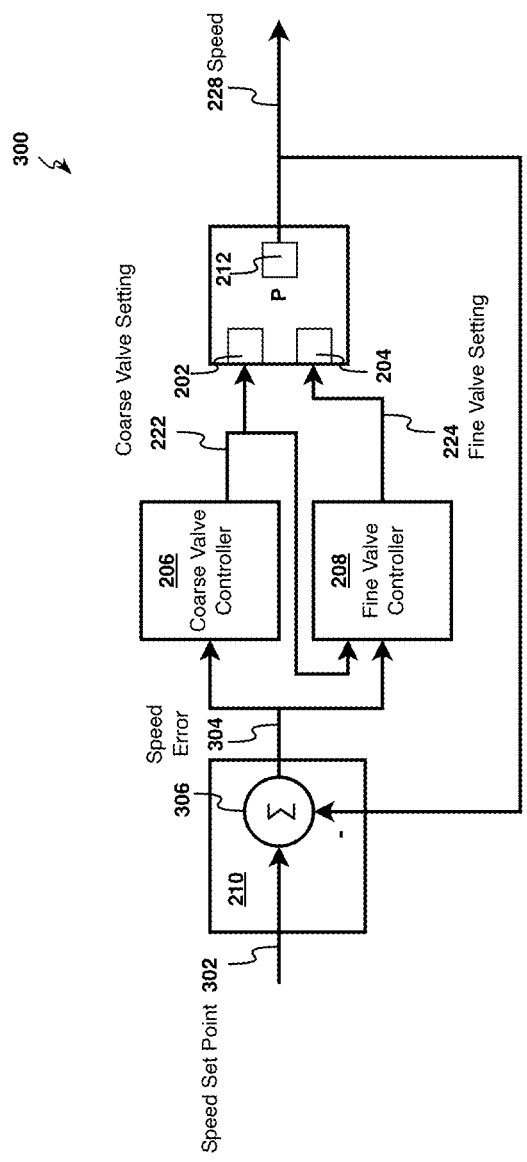
FIG. 3 illustrates an example of a control loop involving a main controller, a coarse valve controller, a fine valve controller, and a flow sensor.

FIG. 3 illustrates an example of a control loop 300 involving the main controller 210, the coarse valve controller 206, the fine valve controller 208, and the flow sensor 212. The main controller 210 receives a speed set point 302, which represents a target speed for the fluid flow 226 through the conduit 220. The main controller 210 also receives the speed 228 of the fluid flow 226 detected by the flow sensor 212 as feedback.

The main controller 210 determines a speed error 304 as a difference between the speed 228 of the fluid flow 226 and the speed set point 302. The main controller 210 may determine the difference by an adder 306, for example. The main controller 210 is configured to provide the speed error 304 to the coarse valve controller 206 and the fine valve controller 208.

The coarse valve controller 206 determines the coarse valve setting 222 from the speed error 304 as explained further below in connection with FIG. 4. In addition, the coarse valve controller 206 may provide the coarse valve setting 222 to the fine valve controller 208. In some examples, such as the example show in FIG. 2, the coarse valve controller 206 provides the coarse valve setting 222 to the fine valve controller 208 via another component such as the main controller 210. In other examples, the coarse valve controller 206 provides the coarse valve setting 222 directly to the fine valve controller 208.

The fine valve controller 208 determines the fine valve setting 224 from the speed error 304 as described further below in connection with FIG. 5. As is also explained in connection with FIG. 5, the fine valve controller 208 may operate as a Proportional Controller unless the coarse valve setting 222 is within a saturation range of the coarse valve 202. If the coarse valve setting 222 is within the saturation range of the coarse valve 202, the fine valve controller 208 operates as a Proportional Integral Controller (PI controller).

The coarse valve 202 and the fine valve 204 are adjusted according to the coarse valve setting 222 and the fine valve setting 224, respectively. The speed 228 of the fluid flow 226 is affected in response to the adjustment of the valves 202 and 204.

The control loop 300, then repeats, starting again with the main controller 210 receiving the speed 228 of the fluid flow 226 detected by the flow sensor 212 as feedback.

Figure 4:
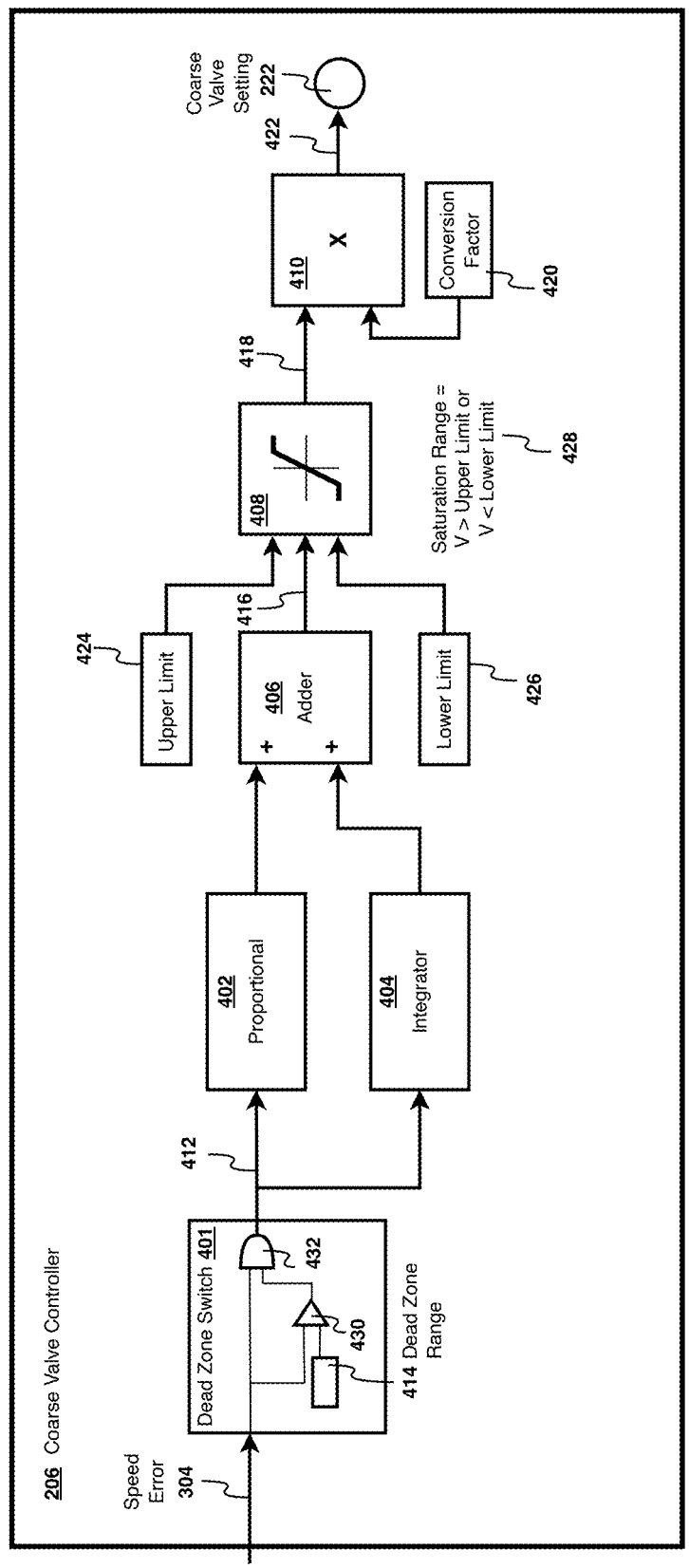
FIG. 4 illustrates an example of a coarse valve controller.

FIG. 4 illustrates an example of the coarse valve controller 206. The coarse valve controller 206 is configured as a PI controller having the control loop 300 shown in FIG. 3. The example of the coarse valve controller 206 includes a dead zone switch 401, a proportional component 402, an integrator 404, an adder 406, a saturation block 408, and a conversion component 410.

The dead zone switch 401 is configured to receive the speed error 304 as an input and to generate a switched speed error 412 as an output. The switched speed error 412 is the speed error 304 unless the speed error 304 falls within a dead zone range 414. If the speed error 304 falls within the dead zone range 414, then the switched speed error 412 is set to zero or substantially zero. The dead zone switch 401 effectively operates as a switch that switches off the speed error 304 if the speed error 304 enters the dead zone range 414. The choice of values defining the dead zone range 414 may be application specific. Typically, the dead zone range 414 is chosen to be a relatively small range around zero. The purpose of the dead zone switch 401 and the dead zone range 414 is to avoid the coarse valve 202 and the fine valve 204 fighting each other or oscillating around each other at a steady state position. An example of the dead zone range 414 may be from −X to +X, where X is a percentage of the largest possible value for the speed error 304. Examples of X may include 3, 4, 5, 10, or any other percentage value specific to the application.

The proportional component 402, the integrator 404, and the adder 406 are configured to perform the following standard control equation:

$$u(t) = Kp\ e(t) + Ki \int_0^t e(\tau)d\tau \quad (1)$$

where u(t) is a valve opening value 416 as a function of time, where e(t) is the switched speed error 412 as a function of time, and where $K_p$ and $K_i$ are the proportional constant and the integral constant, respectively (also referred to as proportional gain and integral gain). The proportional and integral constants may be determined during a tuning procedure using any appropriate tuning method. For example, an appropriate tuning method may be the Ziegler-Nichols tuning method with the "no overshoot" control type. The proportional component 402 performs the Kpe(t) term of the standard control equation (1). The integrator 404 performs the $$Ki \int_0^t e(\tau)d\tau$$

term of the standard control equation (1). The adder 406 sums the two terms to get a valve opening value 416 as a function time, u(t).

The saturation block 408 is configured to keep the valve opening value 416 within an upper limit 424 and a lower limit 426, resulting in a bounded valve opening value 418. For example, the valve opening value 416 may be represented as an opening percentage, where zero percent means the valve is to be closed, and a hundred percent means the valve is to be completely open. For example, the lower limit 426 may be zero percent, and the upper limit 424 might be 100 percent. The lower limit 426 and/or the upper limit 424 may be selected to keep the coarse valve setting 222 within the operating limits of the coarse valve 202 and/or the coarse valve actuator 214. As a result, if the coarse valve setting 222 would otherwise be within a saturation range 428 of the coarse valve 202, the coarse valve setting 222 is maintained at a fixed value just within the operating limits of the coarse valve 202 and/or the coarse valve actuator 214.

The saturation range 428 of the coarse valve 202 is a set of values of the coarse valve setting 222 that exceed a physical limit of the coarse valve actuator 214 and/or the coarse valve 202. In the saturation range 428, the coarse valve actuator 214 and/or the coarse valve 202 may no longer properly realize the motion represented by the coarse valve setting 222 and, as a result, may cause overshoots and/or sustained oscillations. Thus, the lower limit 426 and/or the upper limit 424 may be application specific. The coarse valve 202 may be considered to be in its saturation range 428 if the valve opening value 416, V, is greater than the upper limit 424 or less than the lower limit 426.

The conversion component 410 is configured to convert the bounded valve opening value 418 to an appropriate value or signal for the coarse valve actuator 214. For example, if the coarse valve actuator 214 expects the coarse valve setting 222 to be a current value, such as a value in milliamps, and the relationship between opening percentage and the value or signal for the coarse valve actuator 214 is linear, then the conversion component 410 may be a multiplier configured to multiply the bounded valve opening value 418 (a percentage value) by a conversion factor 420 (such as milliamps per percent) to obtain a physical actuator value 422.

In the example shown in FIG. 4, the dead zone switch 401 includes a comparator 430 and an AND operator 432. The comparator 430 may provide the AND operator 432 with a value of one (1) if the speed error 304 is not in the dead zone range 414 or a value of zero (0) if the speed error 304 is in the dead zone range 414. In turn, the AND operator 432 may provide the speed error 304 as the switched speed error 412 if a one (1) is provided by the comparator 430 indicating the speed error 304 is not in the dead zone range 414. Alternatively, the AND operator 536 may provide a zero (0) as the switched speed error 412 if a zero (0) is provided by the comparator 430 indicating the speed error 304 is in the dead zone range 414.

Figure 5:
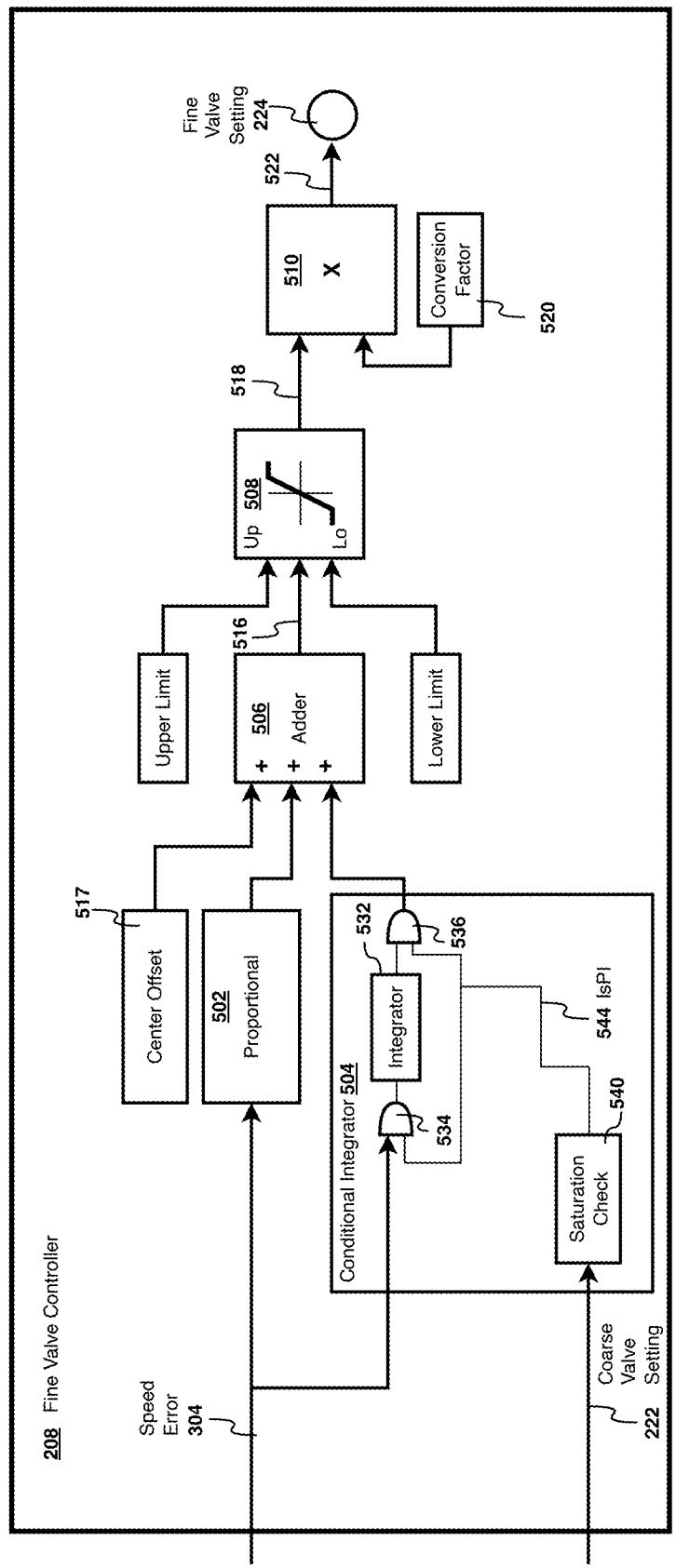
FIG. 5 illustrates an example of a fine valve controller.

FIG. 5 illustrates an example of the fine valve controller 208. The fine valve controller 208 is configured, depending on some conditions, as a Proportional Controller or as a Proportional Integral Controller having the control loop 300 shown in FIG. 3. The example of the fine valve controller 208 includes a proportional component 502, a conditional integrator 504, an adder 506, a saturation block 508, and a conversion component 510.

The fine valve controller 208 is configured as a Proportional Controller unless the coarse valve setting 222 is in the saturation range 428 of the coarse valve 202. If the coarse valve setting 222 is in the saturation range 428 of the coarse valve 202, then the fine valve controller 208 is configured as a PI controller.

In the context of the control of the fine valve 204, the saturation range 428 of the coarse valve 202 may also include any value immediately outside the set of values of the coarse valve setting 222 that exceed the physical limits of the coarse valve actuator 214 and/or the coarse valve 202. This is because the coarse valve controller 206 attempts to keep the coarse valve setting 222 within the physical limits of the coarse valve actuator 214 and/or the coarse valve 202. Accordingly, if the fine valve controller 208 receives the physical actuator value 422 as the coarse valve setting 222, then the fine valve controller 208 may determine that the coarse valve 202 is in the saturation range 428 if Vs>upper−Δ or Vs<lower+Δ, where Vs is the physical actuator value 422, A is a non-zero positive constant, upper is an upper limit of the physical actuator values within the physical limits of the coarse valve 202, and lower is a lower limit of the physical actuator values within the physical limit of the coarse valve 202. Alternatively, if the fine valve controller 208 receives the valve opening value 416 as the coarse valve setting 222, then the coarse valve 202 may be considered in the saturation range 428 if the coarse valve setting 222 is above the upper limit 424 or below the lower limit 426 of the valve opening value 416.

If the coarse valve setting 222 is in the saturation range 428 of the coarse valve 202, then the proportional component 502, the conditional integrator 504, and the adder 506 are configured to perform the following control equation:

$$u(t) = Kp\ e(t) + Ki \int_0^t e(\tau)d\tau + Kc \qquad (2)$$

where u(t) is a valve opening value 516 as a function of time, where e(t) is the speed error 304 as a function of time, where $K_p$ and $K_i$ are the proportional constant and the integral constant, respectively, and Kc is a center offset 517.

The proportional and integral constants may be determined during a tuning procedure using any appropriate tuning method. For example, an appropriate tuning method may be the Ziegler-Nichols tuning method with the "no overshoot" control type. The proportional component 502 performs the $K_p\ e(t)$ term of the control equation (2). An integrator 532 of the conditional integrator 504 performs the $$Ki \int_0^t e(\tau)$$

dτ term of the control equation (2).

The center offset 517 represents where the fine valve 204 is to be positioned when the speed of the fluid flow 226 reaches the speed set point 302 within a tolerance threshold, where the tolerance threshold is a function of the application design limitations. The center offset 517 causes a center-seeking control scheme if the center offset 517 represents a position in which the fine valve 204 is approximately half open. The adder 506 sums the three terms to get the valve opening value 516 as a function time, u(t).

Alternatively, if the coarse valve setting 222 is not in the saturation range 428 of the coarse valve 202, then the proportional component 502 and the adder 506 are configured to perform the control equation (2) with the conditional integrator 504 having zeroed out the $$Ki \int_0^t e(\tau)d\tau$$

term of the control equation (2). For example, the conditional integrator 504 may provide a zero value to the adder 506. As a result, the fine valve controller 208 is configured as a Proportional Controller when the coarse valve setting 222 is not in the saturation range 428 of the coarse valve 202.

In the example shown in FIG. 5, the conditional integrator 504 includes the integrator 532, a first AND operator 534, a second AND operator 536, and a saturation check 5402. The saturation check 540 is configured to output a zero if the coarse valve setting 222 is not in the saturation range 428 of the coarse valve 202, and to output a one if the coarse valve setting 222 is in the saturation range 428 of the coarse valve 202. The output of the saturation check 540 is a "isPI" signal 544. The first AND operator 534 and the second AND operator 536 cause the integrator 532 to integrate the speed error 304 and output the result to the adder 506 if the "isPI" signal is a one, and to output zero to the adder 506 if the "isPI" signal is a zero.

The saturation block 508 is configured to keep valve opening value 516 within an upper limit and a lower limit, resulting in a bounded valve opening value 518. For example, the valve opening value 516 may be represented as an opening percentage, where zero percent means the valve is to be closed, and a hundred percent means the valve is to be completely open. The lower limit and the upper limit may be selected to be any values that avoids potential instability caused by integral windup. Thus, the lower and upper limits may be determined by application design requirements.

The conversion component 510 is configured to convert the bounded valve opening value 518 to an appropriate value or signal for the fine valve actuator 216. The conversion component 510 may use any suitable mapping function. For example, if the fine valve actuator 216 expects the fine valve setting 224 to be a current value, such as a value in milliamps, and the relationship between opening percentage and value or signal for the fine valve actuator 216 is linear, then the conversion component 510 may be a multiplier component configured to multiply the bounded valve opening value 518 (a percentage value) by a positive or negative value 520 (such as milliamps per percent) to obtain a physical actuator value 522. The physical actuator value 522 may be provided as fine valve setting 224.

In the examples of the system 200 of fluid flow control shown in FIGS. 2-5, the system 200 receives the speed set point 302 for the fluid flow 226, the flow sensor 212 detects the speed 228 of the fluid flow 226, and the speed error 304 is determined as a difference between the two values. However, more generally, the system 200 may receive a set point for any property of the fluid flow 226, where the property may or may not be speed; the flow sensor 212 may detect the property of the fluid flow 226; and a signal error (for example, the speed error 304) may be determined as a difference between the set point and the property detected by the flow sensor 212. Examples of the property may include speed, temperature, and pressure.

Figure 6:
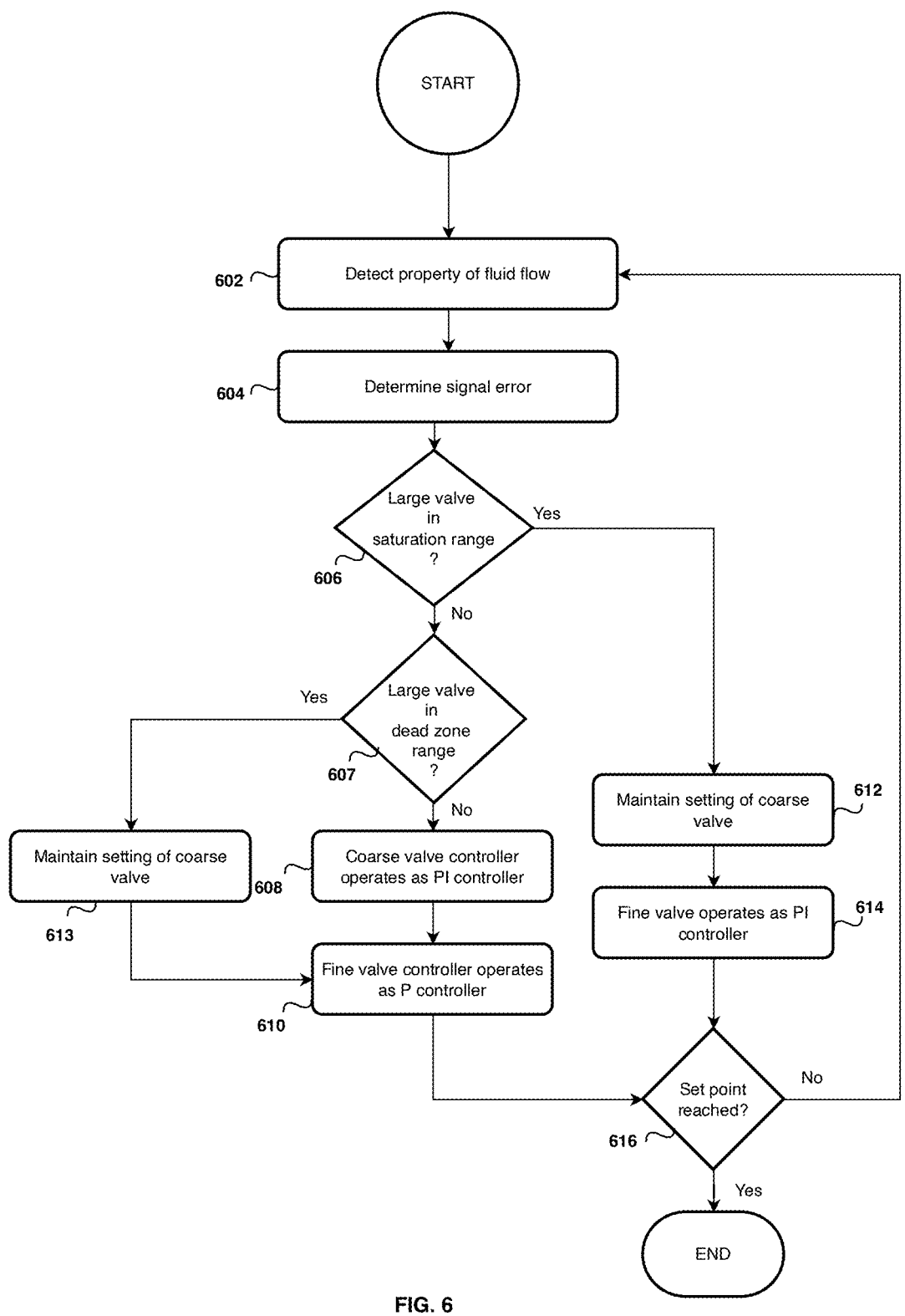
FIG. 6 illustrates a flow diagram of example logic of a system of fluid flow control.

FIG. 6 illustrates a flow diagram of example logic of the system 200 of fluid flow control. The logic may include additional, different, or fewer operations than illustrated in FIG. 6. Alternatively or in addition, the operations may be executed in a different order than illustrated in FIG. 6.

A first operation may be to detect (602) a property of the fluid flow 226. Next, a signal error may be determined (604) as a difference between the property of the fluid flow 226 detected and a set point.

A determination may be made (606) whether the coarse valve 202 is in the saturation range 428. If the coarse valve setting 222 is in the saturation range 428 of the coarse valve 202, then the coarse valve controller 206 maintains (612) the coarse valve setting 222. In addition, the fine valve controller 208 operates (614) as a proportional-integral controller.

Alternatively, if the coarse valve setting 222 is not in the saturation range 428 of the coarse valve 202, then a determination may be made (607) whether the error signal is in the dead zone range 414.

If the error signal is not in the dead zone range 414, then the coarse valve controller 206 operates (608) as a proportional-integral controller. In addition, the fine valve controller 208 operates (610) as a proportional controller.

Alternatively, if the error signal is in the dead zone range 414, then the coarse valve controller 206 maintains (613) the coarse valve setting 222. In addition, the fine valve controller 208 operates (610) as a proportional controller.

After the coarse valve controller 206 and the fine valve controller 208 make any adjustments to the coarse valve 202 and the fine valve 204, respectively, a determination may be made (616) whether the set point has been reached according to the property detected by the flow sensor 212. In other words, whether the error signal is within a tolerance level of zero. If the error signal has not reached zero, then operations may repeat by returning to the operation to detect (602) the property of the fluid flow 226. Alternatively, if the error signal has reached zero, then operations may end.

In other examples, there is no operation to determine (616) whether the set point has reached. Instead, operations return to detect (602) the property of the fluid flow 226 even if the set point was reached.

The system 200 of fluid flow control may be implemented in many ways. Examples are provided below.

The coarse valve 202 and the fine valve 204 may be any type of valve capable of controlling the flow of fluid through the valve. Examples of the coarse valve 202 and the fine valve 204 may include plug valves, butterfly valves, piston valves, gate valves, or any other type of valve.

The coarse valve actuator 214 is shown in FIG. 2 as a discrete component separate from the coarse valve 202. The fine valve actuator 216 is also shown as a discrete component separate from the fine valve 204. However, in other examples, the coarse valve actuator 214 is included in and/or integral to the coarse valve 202. Similarly, the fine valve actuator 216 may be included in and/or integral to the fine valve 204.

The flow sensor 212 may be any device configured to sense and/or measure a property of the fluid flow 226. Examples of the property may include speed, temperature, and pressure. Examples of the flow sensor 212 may include an electromagnetic flow sensor, a Coriolis flow meter, a differential air speed sensor, an air-intake temperature sensor, an intake manifold air temperature sensor, a rotational speed sensor, a pressure sensor, a liquid flow meter, or any other device configured to detect a property of the fluid flow 226.

The fluid 218 may be any type of fluid. For example, the fluid 218 may be a gas, such as air, or a liquid, such as a liquid fuel.

The coarse valve controller 206, the fine valve controller 208, and the main controller 210 may be an analog circuit, a digital circuit, or a combination thereof. In some examples, the coarse valve controller 206, the fine valve controller 208, and/or the main controller 210 may include a portion of computer readable memory in which computer executable instructions or computer code is embedded. The computer executable instructions or computer code may be executable by a processor. The processor may be one or more devices operable to execute logic embedded in computer readable memory.

The structure of each of the following components, taken individually, are well-known in the field of control systems: the adder 306 of the main controller 210; the proportional component 402, the integrator 404, the adder 406, and the saturation block 408 of the coarse valve controller 206; the comparator 430 and the AND operator 432 of the dead zone switch 401; the proportional component 502, the adder 506, and the saturation block 508 of the fine valve controller 208; and the integrator 532, and the first AND operator 534, and the second AND operator 536 of the conditional integrator 504. For example, the integrators 404 and 532 may be any op-amp integrator circuit or a digital integrator based on any suitable mathematical algorithm such as the Romberg algebraic algorithm or the Gauss algorithm; and the adders 306, 406, and 506 may be digital adders and/or analog signal adders, such as resistors for each input connected at a summing junction; and the comparator 430 may be an op-amp comparator.

As mentioned above, the conversion components 410 and 510 may be multipliers. Alternatively, the conversion components 410 and 510 may be any component that implements a mathematical function mapping input values to an output values appropriate for the actuator 214 or 216.

The system 200 may be implemented with additional, different, or fewer components. For example, the system 200 may not include the main controller 210; instead, the coarse valve controller 206 and/or the fine valve controller 208 may include the components shown in the main controller 210. In some examples, the system 200 may include a memory and a processor. Each component may include additional, different, or fewer components than shown in the examples.

Figure 7:
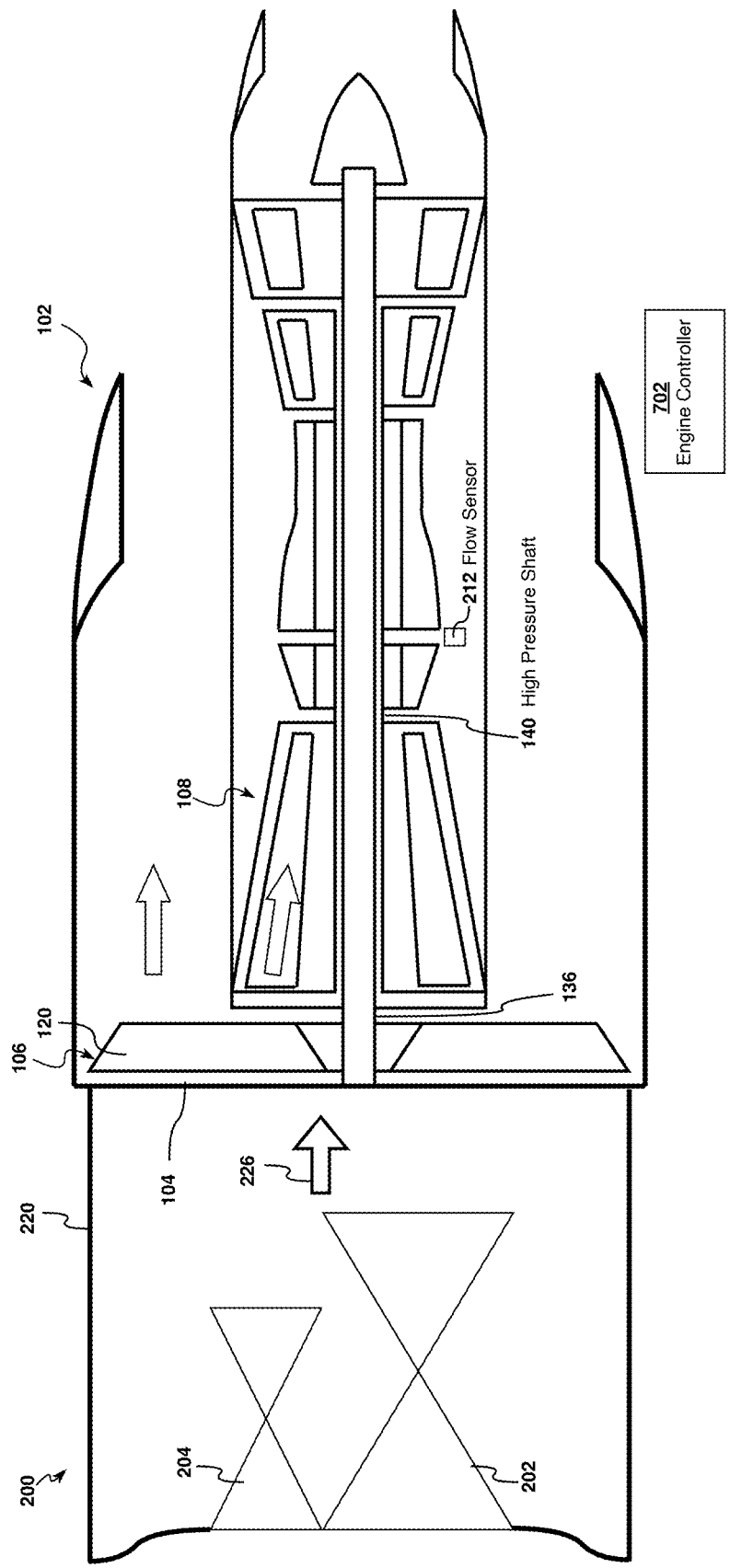
FIG. 7 illustrates a first example of the system for fluid control in the gas turbine engine.

FIG. 7 illustrates a first example of the system 200 for fluid control in the gas turbine engine 102. In the illustrated example, the system 200 controls the fluid flow 226, which is intake air, into the gas turbine engine 102 configured to power a generator. The conduit 220 is arranged to feed the fluid flow 226 into the inlet section 104. Consequently, the system 200 for fluid flow control may control power generated by the gas turbine engine 102.

In some examples, the flow sensor 212 may detect a compressor speed of the gas turbine engine 102. For example, the flow sensor 212 may detect a rotational speed of the high pressure shaft 140, which drives the compressor section 108. In other examples, the flow sensor 212 may detect a different indicator of the speed 228 of the fluid flow 226 into the inlet section 104, such as the low pressure turbine speed or a speed of the low pressure shaft 136.

In some examples, the engine controller 702 may include the main controller 210, the coarse valve controller 206, and/or the fine valve controller 208.

Figure 8:
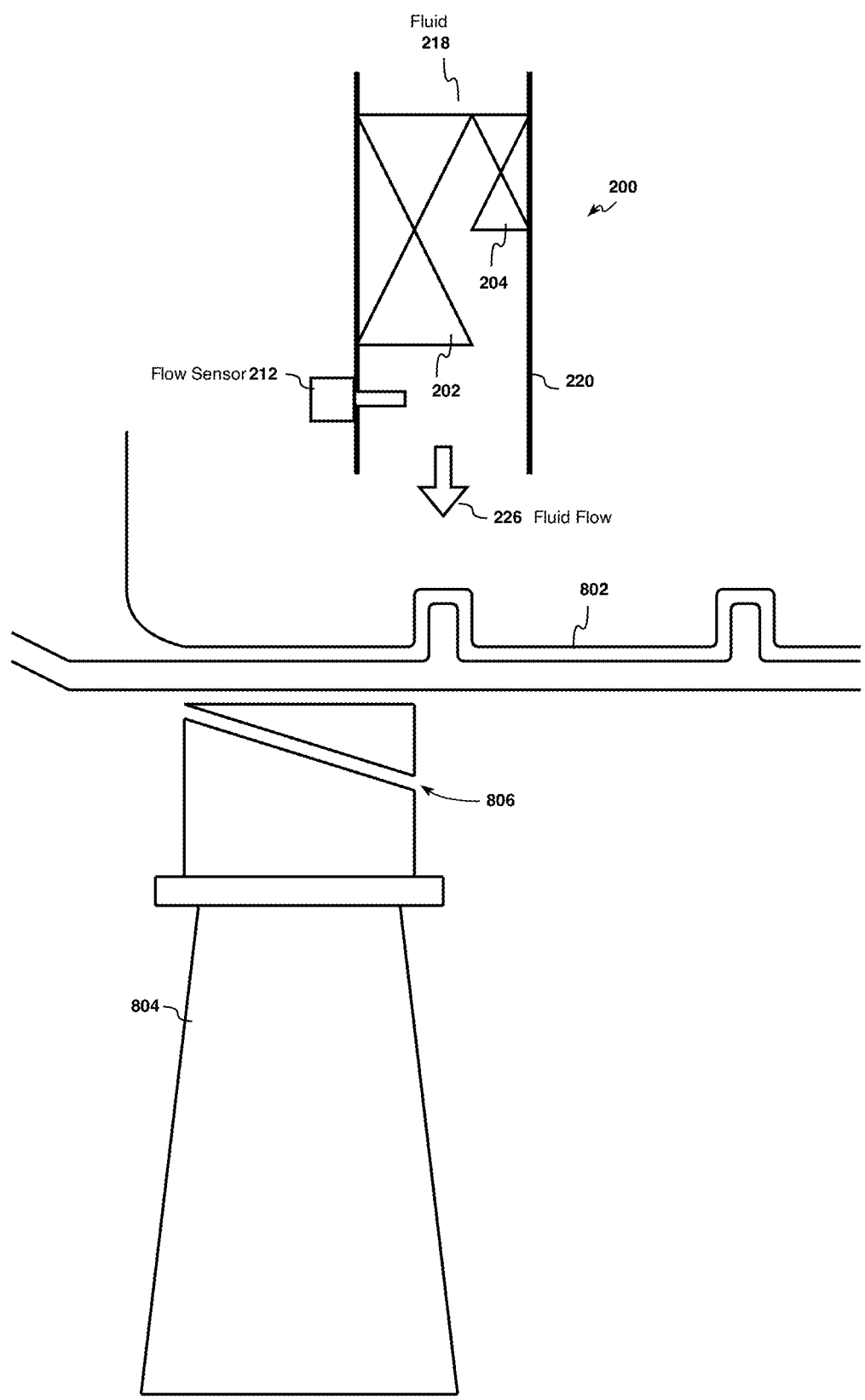
FIG. 8 illustrates a second example of the system for fluid flow control in the gas turbine engine.

FIG. 8 illustrates a second example of the system 200 for fluid flow control in the gas turbine engine 102. In the illustrated example, the system 200 controls the fluid flow 226, which is cooling air, to a turbine case 802. As described in U.S. Patent Application Publication 2019/0024527 A1 ("the '527 application"), entitled "Gas turbine engine with rotor tip clearance control system," a tip clearance control system may control a flow of cooling air (in FIG. 8, the fluid flow 226) to a vanes, blades (such as a turbine blade 804 shown in FIG. 8) and the turbine case 802 of the gas turbine engine 102 to control a distance of a clearance gap 806 between blade tips and blade tracks. The '527 application describes using both an inner cooling of the blades as well as a conditioning of the turbine case 802 to achieve a more precise clearance gap 806 and rotor following during both steady-state and transient control of the clearance gap 806 between each of the blades and the turbine case 802.

The tip clearance control system may be modified as shown in FIG. 8 to include the novel system 200 for fluid flow control to more quickly control targeted changes in the fluid flow 226. The fluid flow 226 may be the cooling air directed at the turbine case 802. Alternatively or in addition, the system 200 may control the flow of cooling air to the vanes and/or blades. The flow sensor 212 may detect a temperature of the fluid flow 226 or any other property of the fluid flow 226. The conduit 220 is configured to transport the cooling air flow (the fluid flow 226) to the turbine case 802.

In still other examples, the system 200 for fluid flow control in the gas turbine engine 102 may be included in an anti-icing system. For example, heat transfer fluid may be fed through an engine section stator to avoid ice buildup. The conduit may be arranged such that the heat transfer medium circulates around a closed circuit between the further heat exchanger and the engine section stator. The fluid 218 in the fluid flow 226 may be the heat transfer medium. The set point for the system 200 for fluid flow control may be heat transfer medium flow speed or temperature.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various examples have been described, it will be apparent to those of ordinary skill in the art that many more examples and implementations are possible. Accordingly, the examples described herein are merely examples, not the only possible examples and implementations.

The subject-matter of the disclosure may also relate, among others, to the following aspects:

A first aspect relates to a system for fluid flow control, the system comprising: a coarse valve; a fine valve, wherein the coarse valve and fine valve are connected in parallel in a conduit, the coarse valve having a larger maximum flow capacity than the fine valve; a flow sensor configured to detect a property of a fluid flow that passes through the coarse valve and the fine valve in the conduit; a coarse valve controller configured to control the coarse valve as a proportional-integral controller having an error signal as an input, wherein the error signal is a difference between the property of the fluid flow and a set point, wherein the coarse valve controller is configured to maintain a position of the coarse valve if the error signal is in a dead zone range or if a coarse valve setting is in a saturation range; and a fine valve controller configured to control the fine valve as a proportional controller having the error signal as an input if the coarse valve setting is not in the saturation range, wherein the fine valve controller is further configured to control the fine valve as a proportional-integral controller having the error signal as the input if the coarse valve setting is in the saturation range, and wherein the fine valve controller has a center-seeking control scheme regardless of whether the fine valve controller is configured as the proportional controller or the proportional-integral controller.

A second aspect relates to the system of aspect 1, wherein the fluid flow is an air flow.

A third aspect relates to any preceding aspect, wherein the fluid flow is an air flow in a gas turbine engine.

A fourth aspect relates to the system of aspect 3, wherein the conduit is arranged to direct the air flow into an inlet section of the gas turbine engine.

A fifth aspect relates to the system of aspect 3, wherein the fluid flow is a cooling air flow, the conduit is configured to transport the cooling air flow to a turbine case around turbine blades for tip clearance control, and the property of the fluid flow the flow sensor is configured to detect is a temperature of the cooling air flow.

A sixth aspect relates to any preceding aspect, wherein the fluid flow is a flow of liquid.

A seventh aspect relates to any preceding aspect, wherein the property of the fluid flow is a speed of the fluid flow.

An eighth aspect relates to a system for fluid flow control in a gas turbine engine, the system comprising: a coarse valve; a fine valve, wherein the coarse valve and fine valve are connected in parallel in a conduit of the gas turbine engine, the coarse valve having a larger maximum flow capacity than the fine valve; a flow sensor configured to detect a property of a fluid flow that passes through the coarse valve and the fine valve in the conduit; a coarse valve controller configured to control the coarse valve in a feedback loop in which an error signal is a feedback to the coarse valve controller and a coarse valve setting is an output of the coarse valve controller, wherein the coarse valve controller is configured as a proportional-integral controller, and wherein the error signal is a difference between the property of the fluid flow and a set point; and a fine valve controller configured to control the fine valve in the same feedback loop as the coarse valve controller, wherein the error signal is the feedback to the fine valve controller, a fine valve setting is an output of the fine valve controller, and the fine valve controller has a center-seeking control scheme, wherein the fine valve controller is configured as a proportional controller or a proportional-integral controller depending on whether the coarse valve setting is in a saturation range.

A ninth aspect relates to the system of aspect 8, wherein the conduit is arranged to direct the fluid flow into a fan section of the gas turbine engine.

A tenth system of aspect 8, wherein the set point is a target speed of the fluid flow, and the error signal is a speed error.

A eleventh aspect relates to the system of aspect 10, wherein the property detected by the flow sensor is a speed of the fluid flow.

A twelfth aspect relates to the system of aspect 11, wherein the flow sensor is configured to detect the speed of the fluid flow from a compressor speed of the gas turbine engine.

A thirteenth aspect relates to the system of any preceding aspect, wherein the coarse valve controller includes a saturation block to avoid the coarse valve setting from driving the coarse valve into the saturation range.

A fourteenth aspect relates to the system of any preceding aspect, further comprising a main controller configured to determine the error signal as the difference between the property of the fluid flow and the set point.

A fifteenth aspect relates to a method of fluid flow control, the method comprising: detecting a property of a fluid flow, the fluid flow passing through a coarse valve and a fine valve, the coarse valve and fine valve connected in parallel, the coarse valve having a larger maximum flow capacity than the fine valve; determining a signal error as a difference between the property of the fluid flow detected and a set point; and controlling the coarse valve by a coarse valve controller and the fine valve with a fine valve controller, the coarse valve controller and the fine valve controller having the error signal as an input, wherein an output of the coarse valve controller includes a coarse valve setting, wherein an output of the fine valve controller includes a fine valve setting, and wherein the fine valve controller has a center-seeking control scheme, wherein controlling the coarse valve includes the coarse valve controller operating as proportional-integral controller in response to the error signal not being in a dead zone range and the coarse valve setting not being in a saturation range of the coarse valve, wherein controlling the fine valve includes operating the fine valve controller, in response to the coarse valve setting being outside the saturation range of the coarse valve, as a proportional controller, wherein controlling the coarse valve includes maintaining the coarse valve setting in response to the error signal being in the dead zone range or the coarse valve setting being in the saturation range of the coarse valve, and wherein controlling the fine valve includes operating the fine valve controller, in response to the coarse valve setting being in the saturation range of the coarse valve, as a proportional-integral controller.

A sixteenth aspect relates to the method of aspect 15 wherein the fluid flow is an air flow into a fan stage of a gas turbine engine.

A seventeenth aspect relates to the method of aspect 16 wherein detecting the property includes detecting a compressor speed of the gas turbine engine.

An eighteenth aspect relates to the method of aspect 16 wherein detecting the property includes detecting a shaft speed of the gas turbine engine.

A nineteenth aspect relates to any preceding method aspect further comprising determining a proportional gain and an integral gain for the coarse valve controller by applying a Ziegler-Nichols tuning method with a no overshoot control type.

A twentieth aspect relates to any preceding method aspect further comprising determining a proportional gain and an integral gain for the fine valve controller by applying a Ziegler-Nichols tuning method with a no overshoot control type.

In addition to the features mentioned in each of the independent aspects enumerated above, some examples may show, alone or in combination, the optional features mentioned in the dependent aspects and/or as disclosed in the description above and shown in the figures.

What is claimed is:

1. A system for fluid flow control, the system comprising:
    a coarse valve;
    a fine valve, wherein the coarse valve and fine valve are connected in parallel in a conduit, the coarse valve having a larger maximum flow capacity than the fine valve;
    a flow sensor configured to detect a property of a fluid flow that passes through the coarse valve and the fine valve in the conduit;
    a coarse valve controller configured to control the coarse valve as a proportional-integral controller having an error signal as an input, wherein the error signal is a difference between the property of the fluid flow and a set point, wherein the coarse valve controller is configured to maintain a position of the coarse valve if the error signal is in a dead zone range or if a coarse valve setting is in a saturation range; and
    a fine valve controller configured to control the fine valve as a proportional controller having the error signal as an input unless the coarse valve setting is in the saturation range,
    wherein the fine valve controller is further configured to control the fine valve as a proportional-integral controller having the error signal as the input if the coarse valve setting is in the saturation range, and
    wherein the fine valve controller has a center-seeking control scheme regardless of whether the fine valve controller is configured as the proportional controller or the proportional-integral controller.

2. The system of claim 1, wherein the fluid flow is an air flow.

3. The system of claim 1, wherein the fluid flow is an air flow in a gas turbine engine.

4. The system of claim 3, wherein the conduit is arranged to direct the air flow into an inlet section of the gas turbine engine.

5. The system of claim 3, wherein the fluid flow is a cooling air flow, the conduit is configured to transport the cooling air flow to a turbine case around turbine blades for tip clearance control, and the property of the fluid flow the flow sensor is configured to detect is a temperature of the cooling air flow.

6. The system of claim 1, wherein the fluid flow is a flow of liquid.

7. The system of claim 1, wherein the property of the fluid flow is a speed of the fluid flow.

8. A system for fluid flow control in a gas turbine engine, the system comprising:
    a coarse valve;
    a fine valve, wherein the coarse valve and fine valve are connected in parallel in a conduit of the gas turbine engine, the coarse valve having a larger maximum flow capacity than the fine valve;
    a flow sensor configured to detect a property of a fluid flow that passes through the coarse valve and the fine valve in the conduit;
    a coarse valve controller configured to control the coarse valve in a feedback loop in which an error signal is a feedback to the coarse valve controller and a coarse valve setting is an output of the coarse valve controller, wherein the coarse valve controller is configured as a proportional-integral controller, and wherein the error signal is a difference between the property of the fluid flow and a set point; and
    a fine valve controller configured to control the fine valve in the same feedback loop as the coarse valve controller, wherein the error signal is the feedback to the fine valve controller, a fine valve setting is an output of the fine valve controller, and the fine valve controller has a center-seeking control scheme,
    wherein the fine valve controller is configured as a proportional controller or a proportional-integral controller depending on whether the coarse valve setting is in a saturation range.

9. The system of claim 8, wherein the conduit is arranged to direct the fluid flow into a fan section of the gas turbine engine.

10. The system of claim 8, wherein the set point is a target speed of the fluid flow, and the error signal is a speed error.

11. The system of claim 10, wherein the property detected by the flow sensor is a speed of the fluid flow.

12. The system of claim 11, wherein the flow sensor is configured to detect the speed of the fluid flow from a compressor speed of the gas turbine engine.

13. The system of claim 9, wherein the coarse valve controller includes a saturation block to avoid the coarse valve setting from driving the coarse valve into the saturation range.

14. The system of claim 8, further comprising a main controller configured to determine the error signal as the difference between the property of the fluid flow and the set point.

15. The system of claim 9, wherein the property includes a shaft speed of the gas turbine engine.

\* \* \* \* \*